Feb. 15, 1966          C. B. OLESEN           3,235,269
       METHOD OF SEALING A TURBINE OR COMPRESSOR SHAFT
                    Filed May 23, 1963
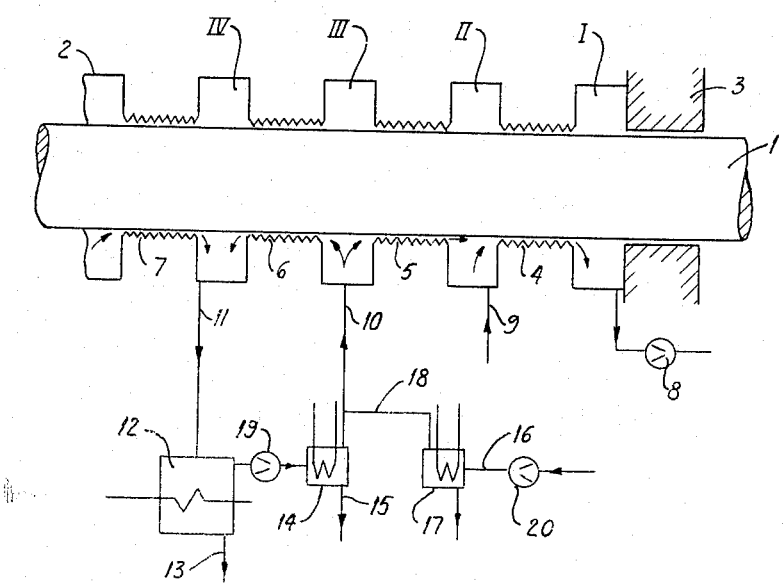
INVENTOR.
Carsten Balslev Olesen
BY

United States Patent Office 3,235,269
Patented Feb. 15, 1966

3,235,269
METHOD OF SEALING A TURBINE OR COMPRESSOR SHAFT
Carsten Balslev Olesen, Finspang, Sweden, assignor to Stal-Laval Turbin AB, Finspang, Sweden, a Swedish corporation
Filed May 23, 1963, Ser. No. 282,781
Claims priority, application Sweden, Sept. 5, 1962, 9,582
2 Claims. (Cl. 277—1)

This invention relates to a means and method for sealing a turbine or compressor shaft by means of a shaft-sealing arrangement located between a chamber containing vapour of, for example heavy water ($D_2O$) and a bearing, and it comprises a series of clearance seals, separated from each other by chambers. The arrangement according to the present invention is so constructed that air at atmospheric pressure is admitted to one of the chambers, and air mixed with oil, formed by oil leaking from the bearing to another of the chambers in one direction along the shaft, and by atmospheric air leaking from the first chamber in the other direction, in withdrawn by a fan, thereby maintaining a pressure lower than atmospheric in the second-mentioned chamber.

Dry blocking air at a pressure higher than atmospheric, admitted to a third chamber, leaks along the shaft partly to the first chamber and partly to a fourth chamber, which latter chamber receives $D_2O$ which leaks from the vapour-containing chamber. Air and $D_2O$ vapour is withdrawn from the fourth chamber to a leakage condenser, from which $D_2O$ is discharged and dry air is admitted to the third chamber, while dry atmosphere is added.

By admitting dry blocking air according to the invention, the mixing of steam in the atmospheric air with the $D_2O$ vapour is avoided. When such a mixture occurs, the $D_2O$ vapour loses its properties and has to be cleaned, and that involves an expensive process. Large quantities of expensive $D_2O$ vapour are likely to be lost and this is avoided by drying the $D_2O$ saturated air from the leakage container, and by passing the dried air back to the shaft sealing.

With these and other objects to be hereinafter set forth in view, I have devised the arrangement of parts to be described and more particularly pointed out in the claims appended hereto.

In the accompanying drawing wherein an illustrative embodiment of the invention is disclosed, The figure shown is a diagrammatic view of a shaft sealing arrangement according to the invention.

Referring to the drawing, 1 indicates a shaft which for example may be that of a turbine operating with $D_2O$ vapour, and 2 indicates a vapour chamber of the turbine. The shaft operates in a bearing 3 and between the vapour chamber 2 and the bearing 3, the shaft 1 is provided with a sealing arrangement comprising a series of clearance seals indicated respectively at 4, 5, 6 and 7. These clearance seals are separated from one another by the chambers indicated respectively at I, II, III and IV.

From the bearing 3, oil leaks into the chamber I, into which an air pressure lower than atmospheric is maintained by a suction fan 8, and to which chamber I air from the opposite side leaks along the shaft 1 from the chamber indicated at II, which is provided with air at atmospheric pressure by means of the piping 9. An air flow is thus created toward the bearing 3 over the sealing edges of the clearance seal 4, thus preventing oil leakage through said seal.

Dry blocking air at a pressure above atmospheric, is admitted to the chamber shown at III through piping 10. Some of said air flows to the chamber II, which contains air at atmospheric pressure, while some enters the chamber IV, from whence the air and vapour from the chamber 2 pass through piping 11 to a leakage condenser 12. From said condenser $D_2O$ is discharged through a piping 13, while $D_2O$ saturated air is drawn into a drying device 14 by means of a fan 19, from which drying device $D_2O$ is discharged through a piping 15 and dry air is admitted to the chamber III through the piping 10.

To replace the air discharged by the fan 8 through the sealing points 4 and 5, air is drawn in by a fan 20 through a piping 16 to a drying device 17, from where it is admitted to the piping 10 through piping 18.

Having thus described a single embodiment of the invention, it is obvious that the same is not to be restricted thereto, but is broad enough to cover all structures and methods coming within the scope of the annexed claims.

What is claimed is:

1. The method of sealing a turbine or compressor shaft by means of a sealing arrangement located between a chamber containing vapour such as heavy water ($D_2O$) and a bearing, and comprising a series of clearance seals, which clearance seals are separated from one another by chambers I, II, III and IV in sequence from the bearing and located around the shaft, characterized in that air of atmospheric pressure is admitted to the chamber II and that air mixed with oil, formed by oil leaking to the chamber I in one direction along the shaft from the bearing, and by atmospheric air leaking from the chamber II in the opposite direction, is withdrawn by a fan, maintaining a pressure lower than atmospheric in the chamber I, admitting dry blocking air into the chamber III at a pressure higher than atmospheric and which air leaks along the shaft partly to the chamber II and partly to the chamber IV, to which latter chamber $D_2O$ vapour also leaks from the vapour chamber, and that air and $D_2O$ vapour are withdrawn from the chamber IV to a leakage condenser from which $D_2O$ is discharged and $D_2O$ saturated air is drawn into a drying device from which $D_2O$ is discharged and dry air is admitted to the chamber III, while dry atmosphere is added.

2. A sealing arrangement for sealing a turbine or compressor shaft between a vapour chamber and a bearing comprising; a series of clearance seals arranged around the shaft between the vapour chamber and the bearing, said seals being separated from one another by chambers, means for admitting air mixed with oil from the bearing into a first chamber, means for admitting atmospheric air into a second chamber, means for withdrawing atmospheric air mixed with oil from the said first and second chambers, means for admitting dry blocking air at a pressure higher than atmospheric pressure into a third chamber, a leakage condenser to which air and vapours are directed from a fourth chamber, a drying device into which saturated air is drawn and from which the vapour is discharged, and means for admitting dry air from the drying device to the third chamber to which dry atmospheric air is added.

References Cited by the Examiner
UNITED STATES PATENTS

| 1,932,995 | 10/1933 | Van Rijswijk | 277—1 |
| 2,650,116 | 8/1953 | Cuny | 277—3 |
| 3,003,321 | 10/1961 | Warth | 277—12 X |
| 3,131,939 | 5/1964 | Cuny | 277—15 |

LAVERNE D. GEIGER, *Primary Examiner.*